(12) United States Patent
Shafer et al.

(10) Patent No.: US 7,441,018 B1
(45) Date of Patent: Oct. 21, 2008

(54) IDENTIFICATION OF APPLIED CONFIGURATION INFORMATION (75) Inventors: Philip A Shafer, Raleigh, NC (US); Reid E Wilson, Cary, NC (US)

(73) Assignee: Juniper Networks, Inc., Sunnyvale, CA (US)

( * ) Notice: Subject to any disclaimer, the term of this patent is extended or adjusted under 35 U.S.C. 154(b) by 851 days.

(21) Appl. No.: 10/247,803

(22) Filed: Sep. 19, 2002

Related U.S. Application Data (60) Provisional application No. 60/323,419, filed on Sep. 19, 2001.

(51) Int. Cl.
G06F 15/177 (2006.01)
G06F 15/173 (2006.01)

(52) U.S. Cl. .................. 709/220; 709/223; 709/224

(58) Field of Classification Search .............. 709/223, 709/220, 221, 222, 224
See application file for complete search history.

(56) References Cited

U.S. PATENT DOCUMENTS

| 5,648,795 | A | 7/1997 | Vouri et al. | |
|---|---|---|---|---|
| 5,964,844 | A | 10/1999 | Rosenthal | |
| 6,212,559 | B1 | 4/2001 | Bixler et al. | |
| 6,225,999 | B1* | 5/2001 | Jain et al. | 715/734 |
| 6,269,398 | B1 | 7/2001 | Leong et al. | |
| 6,359,859 | B1* | 3/2002 | Brolin et al. | 370/218 |
| 6,446,110 | B1* | 9/2002 | Lection et al. | 709/203 |
| 6,510,434 | B1 | 1/2003 | Anderson et al. | |
| 6,594,672 | B1 | 7/2003 | Lampson et al. | |
| 6,640,241 | B1 | 10/2003 | Ozzie et al. | |
| 6,751,663 | B1* | 6/2004 | Farrell et al. | 709/224 |
| 6,766,368 | B1 | 7/2004 | Jakobson et al. | |
| 6,920,492 | B2* | 7/2005 | Richard | 709/220 |
| 6,925,595 | B1 | 8/2005 | Whitledge et al. | |
| 6,944,659 | B2* | 9/2005 | Taggart et al. | 709/224 |
| 6,990,601 | B1 | 1/2006 | Tsuneya et al. | |
| 7,054,901 | B2 | 5/2006 | Shafer | |
| 7,072,946 | B2 | 7/2006 | Shafer | |
| 7,206,934 | B2 | 4/2007 | Pabla et al. | |
| 7,222,187 | B2 | 5/2007 | Yeager et al. | |
| 7,275,102 | B2 | 9/2007 | Yeager et al. | |
| 2002/0021713 | A1* | 2/2002 | Rezaie et al. | 370/468 |
| 2002/0161875 | A1* | 10/2002 | Raymond | 709/223 |
| 2002/0161876 | A1* | 10/2002 | Raymond | 709/223 |
| 2002/0169794 | A1* | 11/2002 | Jones et al. | 707/204 |
| 2002/0178243 | A1* | 11/2002 | Collins | 709/223 |
| 2002/0184347 | A1* | 12/2002 | Olson et al. | 709/220 |
| 2003/0014447 | A1 | 1/2003 | White | |

* cited by examiner

OTHER PUBLICATIONS

U.S. Appl. No. 10/247,778, filed Sep. 19, 2002, Philip A. Shafer and Reid E. Wilson.

Primary Examiner—John Follansbee
Assistant Examiner—Alan S Chou
(74) Attorney, Agent, or Firm—Shumaker & Sieffert, P.A.

(57) ABSTRACT

A network device displays applied and non-applied configurations in different formats to facilitate distinguishing between active and inactive configurations. In this way, a user can readily distinguish, for example, between applied configurations for active interfaces from loaded configurations for inactive interfaces and non-applied configurations for active interfaces. Configuration information may be encoded using an extensible markup language to identify the type of configuration. The network device uses this type identification to determine whether a particular part of the configuration should be displayed in as normal text or as altered text. The part of the configuration that is displayed in the altered form may represent the non-applied configurations.

42 Claims, 7 Drawing Sheets

```
interfaces {
    at-0/0/0 {
        unit 0 {
            family inet {
                address 10.0.0.1/8;
            }
        }
    } fe-0/0/0 {
        unit 0 {
            family inet {
                address 10.0.0.1/8;
            }
        }
    } so-0/0/0 {
        unit 0 {
            family inet {
                address 10.0.0.1/8;
            }
        }
    }
}
```

FIG. 6

```
interfaces    {
        at-0/0/0 { #warning: 0/0/0 is fe ifc
              unit 0 {
                      family inet   {
                              address 10.0.0.1/8;
                      }
              }
        } fe-0/0/0
              unit 0 {
                      family inet   {
                              address 10.0.0.1/8;
                      }
              }
        } so-0/0/0 { #warning: 0/0/0 is fe ifc
              unit 0 {
                      family inet   {
                              address 10.0.0.1/8;
                      }
              }
        }
}
```

FIG. 7

IDENTIFICATION OF APPLIED CONFIGURATION INFORMATION

This application claims priority from U.S. provisional application Ser. No. 60/323,419, filed Sep. 19, 2001, the entire content of which is incorporated herein by reference.

TECHNICAL FIELD

The invention relates to computer networks and, more particularly, to configuration of such networks.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain network devices, such as routers, maintain tables of routing information that describe routes through the network. A "route" can generally be defined as a path between two locations on the network. Upon receiving an incoming data packet, the network device examines destination information within the packet to identify the destination for the packet. Based on the destination, the network device forwards the packet in accordance with the routing table.

A network device such as a router uses interface cards (IFCs) for receiving and sending data packets via network links. These IFCs are installed in ports known as interfaces and are configured using interface configurations. A network device can be manufactured with one or more interface configurations, including, for example, ATM, fast Ethernet, and Sonet interface configurations. In particular, a network device may include interface configuration for interfaces in which IFCs have been installed, as well as interfaces in which IFCs have not been installed. In addition, the network device may include a number of different configurations for a particular interface, enabling the network device to be preconfigured with a number of different upgrade paths.

When a new interface card is added to an interface in the network device, the interface is typically configured by selecting one of the pre-defined configurations that is appropriate for the type of interface card added to the interface. For example, if a fast Ethernet interface card is installed, a technician may select a pre-defined fast Ethernet configuration. Because this configuration already exists in the network device, it is not necessary for the technician to load the configuration, and installation is less complicated and time-consuming.

Before an interface card is installed in an interface, the interface can be considered a "phantom" interface in that it contains no interface card and is, as a result, inoperative. An interface may also be phantom after removal of a previously installed interface card whose configuration may remain loaded in the network device for potential use in a future installation of an interface card. An interface can also be phantom even if an interface card is installed, for example, if the network device stores multiple configuration options for the pertinent interface card slot. In particular, when the technician selects one of the configuration options, the other configuration options may remain stored in the network device. Generally, an interface can be considered phantom if it is associated with one or more interface card configurations that are not currently active.

The presence of a phantom interface may be confusing for installation technicians, network administrators, and other users who access the network device to obtain operational and configuration information. When such a user enters a command to display the configuration of the network device, the network device typically displays all of the configurations currently loaded in the network device, including those for phantom interfaces. This manner of presentation may confuse the user, particularly when multiple configuration options are loaded for a single interface. For example, when an interface card is installed, the user may have difficulty determining which configuration the technician selected for the interface card. Confusion may also arise if no interface card is physically installed in the interface. In particular, a user viewing the configuration may not be aware of the absence of an interface card without physically inspecting the network device interface.

SUMMARY

In general, the invention facilitates determining whether a network device configuration is applied or non-applied by visually distinguishing between active and inactive configurations presented via a user interface associated with the network device. In this way, the user can readily distinguish applied configurations for active interfaces from loaded configurations for inactive interfaces and non-applied configurations for active interfaces, avoiding confusion caused by phantom interfaces.

Certain embodiments of the invention may involve encoding configuration information using an extensible markup language, such as XML. XML is one example of an extensible markup language in the class encompassed by the Standard Generalized Markup Language (SGML) specification, and will be described herein for purposes of illustration. The configuration information is encoded to identify the type of configuration, e.g., a configuration for a particular type of interface card.

After receiving a query to show the network device configuration, e.g., "show interfaces," the network device displays part of the configuration as normal text and part of the configuration as text that is altered in some way to distinguish it from normal text. The part of the configuration that is displayed in the altered form represents the non-applied configurations. Alternatively, the part of the configuration displayed in the altered form may represent applied configurations, so long as the applied and non-applied configurations are distinguishable by the user.

Similarly, altered text may be displayed with feedback from the network device following execution of a command to configure the network device. For example, the network device may permit a configuration command to run to completion, but provide feedback indicating that the completed configuration command was not effective. A configuration command may not be effective, for example, when the command is not supported by existing hardware associated with an interface. For configuration commands and configuration queries, altered text may be distinguished from normal text by a variety of methods, including italicization, capitalization, highlighting, underlining, bolding, parentheses, colored text, addition of advisory comments, spatial separation from normal text within a display, e.g., separate columns or rows on the display, and the like.

In one embodiment, the invention is directed to a network device-implemented method that includes displaying configuration information in one format when the configuration information is currently applied and displaying it in a different format when the configuration information is not currently applied.

Another method consistent with the principles of the invention includes identifying a portion of network device configuration information that represents an active interface and another portion of the network device configuration information that does not represent the active interface. The portion of the network device configuration information that represents an active interface is displayed in a first text format, and the portion that does not represent the active interface is displayed in a second text format.

The invention may be capable of providing one or more advantages. For example, the invention may provide a convenient mode for distinguishing applied and non-applied configurations, and identifying configuration commands that were ineffective. In this manner, the invention can alleviate confusion on the part of installation technicians, network administrators, and other users who access the network device to obtain operational and configuration information, or configure the network device.

Other embodiments are directed to processor-readable media, apparatuses, and systems for performing these methods. The details of one or more embodiments of the invention are set forth in the accompanying drawings and the description below. Other features, objects, and advantages of the invention will be apparent from the description and drawings, and from the claims.

DETAILED DESCRIPTION

In accordance with the principles of the invention, a network device such as a router displays applied and non-applied configurations in different formats to facilitate distinguishing between active and inactive configurations. In this way, a user can readily distinguish, for example, applied configurations for active interfaces from loaded configurations for inactive interfaces and non-applied configurations for active interfaces. Configuration information may be encoded using an extensible markup language, such as XML, to identify the type of configuration. XML is one example of an extensible markup language in the class encompassed by the Standard Generalized Markup Language (SGML) specification, and will be described herein for purposes of illustration.

Based on whether the configuration is applied or non-applied, e.g., whether the configuration relates to an interface that is active or inactive, the network device determines whether a particular part of the configuration should be displayed as normal text or as altered text. An indication of whether a configuration has been applied to an active interface can be provided in a network device configuration database maintained by the network device. For example, the text in the altered form may be displayed in a highlighted, shaded, underlined, bolded, bracketed, italicized, or commented format, or in a different font color or font size. In addition, the text may be spatially separated on a display from normal text, e.g., as being indented, displayed in a different row or column of the display, or the like. In one embodiment, the part of the configuration that is displayed in the altered form may represent the non-applied configurations. As another alternative, the configuration information can be presented as a set of hypertext links that are formatted to indicate whether they correspond to applied or non-applied configuration information. A user may click on the links to view more detailed configuration information.

In this discussion, various embodiments of the invention are described in the context of distinguishing between interface configurations that are currently applied and those that are not currently applied. The principles of the invention, however, are generally applicable to any application in which distinguishing between applied and non-applied configuration information would be beneficial. Also, the invention will be described generally herein in the context of routers. However, other network devices such as switches, hubs, firewalls, gateways, and the like may benefit from incorporation of structure and functionality similar to that described herein.

Figure 1:
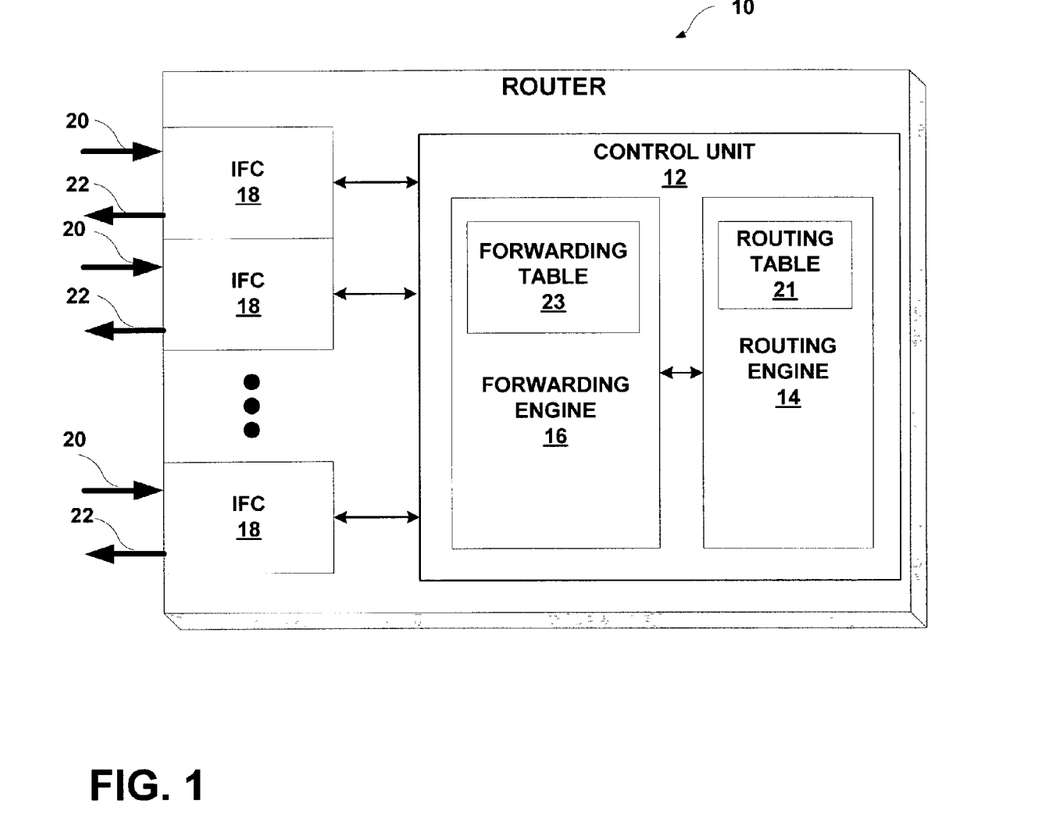
FIG. 1 is a block diagram illustrating an example network device, in the form of a router, configured consistent with the principles of the invention.

FIG. 1 is a block diagram illustrating an example network device in the form of a router 10 appropriate for displaying configuration information in accordance with the principles of the invention. Network router 10 receives and forwards data packets across a network. As shown in FIG. 1, router 10 includes a control unit 12 with a packet routing engine 14 and a packet forwarding engine 16. Router 10 also includes one or more interface cards (IFCs) 18 for receiving and sending data packets via network links 20 and 22, respectively. Control unit 12 routes inbound packets received from inbound link 20 to the appropriate outbound link 22. Control unit 12 routes packets according to routing information stored in routing table 21.

Routing engine 14 maintains and updates the routing information within routing table 21. Routing engine 16 analyzes the contents of routing table 21, and pre-selects routes and generates forwarding table 23 to identify corresponding output interfaces of interface cards 18 to be used when forwarding packets along the pre-selected routes. Forwarding engine 16 then stores the selected routes in forwarding table 23. Upon receiving an inbound packet, forwarding engine 16 examines information within the packet to identify the destination of the packet. Based on the destination, forwarding engine 16 forwards the packet to one of the IFCs 18.

IFCs 18 are installed in physical interface slots provided in the router chassis (not shown), and form router interfaces. Interface configurations allow the interfaces to use IFCs 18 to send and receive data using network links 20 and 22, and are specific to the type of IFC installed in an interface. For example, one interface may use an ATM configuration, another may use a fast Ethernet configuration, and still another may use a Sonet configuration. To simplify installation, an interface may store multiple configurations and only apply the configuration that corresponds to the installed IFC.

Consistent with the principles of the invention, control unit 12 is configured to identify which type of IFC, if any, is installed in an interface slot of router 12 and which interface configuration information corresponds to the installed IFC. For example, control unit 12 may reference a configuration database to identify the type of IFC that is installed in the particular interface slot. More generally, control unit 12 may reference the configuration interface information to identify what hardware devices are installed in the router, and to identify the respective types of those hardware devices.

Control unit 12 identifies this configuration by comparing the type of the installed IFC with the IFC type represented by the configuration information. Portions of the interface configuration information may be marked using, for example, XML tags, to identify the IFC types with which they correspond.

When control unit 12 receives a user interface request to display the router configuration, it visually indicates to the user which configuration is currently applied. The configuration information may be presented to a user via a display associated with a client device. The applied configuration will typically be the one that corresponds to the installed IFC. If no IFC is installed in the interface, none of the loaded configurations will be applied. Control unit 12 may distinguish between applied and non-applied configuration information by displaying the inactive configuration information as text in an altered format. By way of example, text corresponding to non-applied configuration information may be displayed as text that is highlighted, shaded, bracketed, commented, or altered in some other way. Of course, an inverse arrangement could be used in which the applied configuration information is displayed in an altered format.

In addition to distinguishing applied and non-applied configurations stored in the configuration database in response to a request for configuration information, control unit 12 may respond similarly to new configuration requests. When a user seeks to modify or add a configuration by entry of a configuration command, for example, control unit 12 may permit the configuration command to run to completion, but provide feedback indicating whether the configuration command is effective or not. The feedback may be accompanied by altered text, as described herein, which identifies the attempted configuration change or addition as being ineffective. The feedback may be presented to a user via a display associated with a client device.

Figure 2:
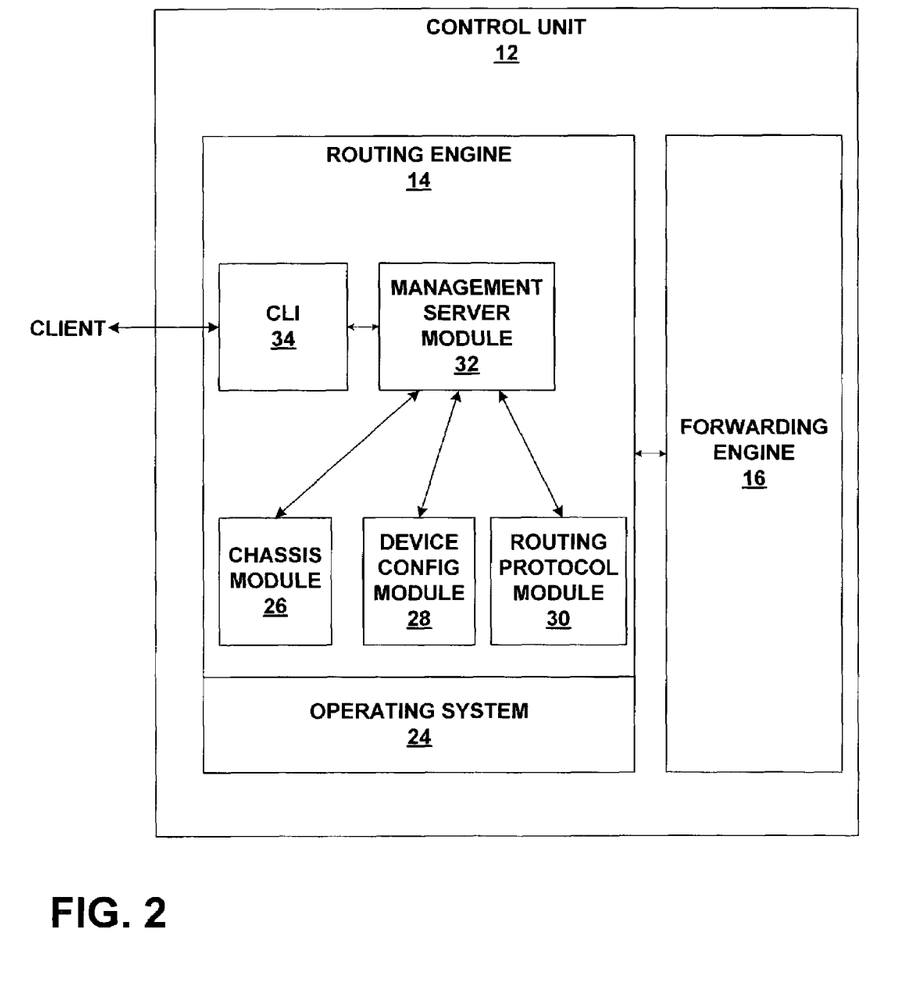
FIG. 2 is a block diagram illustrating an example routing engine consistent with the principles of the invention.

FIG. 2 is a block diagram illustrating an example router control unit 12 incorporating a command line interface consistent with the principles of the invention. In the example of FIG. 2, control unit 12 includes packet routing engine 14 and packet forwarding engine 16. Within control unit 12, routing engine 14 provides a management interface that interacts with a number of software modules running within an operating environment provided by operating system 24. Operating system 24 provides a multi-tasking operating system for execution of a number of concurrent processes. An example of such an operating system is FreeBSD, which is an advanced UNIX operating system that is compatible with a number of programmable processors (not shown), including processors commercially available from Intel Corporation.

As examples, routing engine 14 may include a chassis module 26, a device configuration module 28, and a routing protocol module 30 running as processes within the operating environment of operating system 24. A management server module 32 provides a user interface for interaction with system modules 26, 28, 30. Chassis module 24 defines an inventory and status of components installed in the chassis of network router 10, including IFCs 18. Device configuration module 28 defines and controls the physical configuration of network router 10. Routing protocol module 30 administers protocols supported by network router 10. For example, routing protocol module 30 may implement protocols for exchanging route information with other routing devices and for updating routing table 21 (shown in FIG. 1).

Management server module 32 communicates with one or more client interface modules running on routing engine 14. In the example of FIG. 2, management server module 32 communicates with a command line interface (CLI) module 34. Command line interface module 34 serves as a daemon process that listens for requests from network router clients. The clients may take the form of human users such as system administrators or automated script applications. Initially, command line interface module 34 listens for CLI commands, and passes them to management server module 32 for handling. The command line interface presented by control unit 12 can be dynamically replaced with an XML-based Application Programming Interface (API) upon receipt of a particular CLI command from a client. More specifically, management server module 32 redirects incoming commands from CLI 34 and services them based on the XML-based API.

XML is one example of an extensible markup language in the class encompassed by the Standard Generalized Markup Language (SGML) specification, and will be described herein for purposes of illustration. The official XML specification is governed by the World Wide Web Consortium and is available on the World Wide Web at http://www.w3.org/TR/REC-xml. The structure of the XML tags communicated via the XML API may be defined using Data Type Definition (DTD) files, XML Schema Language files, or other similar devices for XML tag definition. As an example, the XML tags may conform to the evolving JUNOScript™ API developed by Juniper Networks, Inc. of Sunnyvale, Calif. The JUNOScript™ API is described in JUNOScript™ API Guide and Reference, Version 4.4, available from Juniper Networks, Inc., the entire content of which is incorporated herein by reference.

Figure 3:
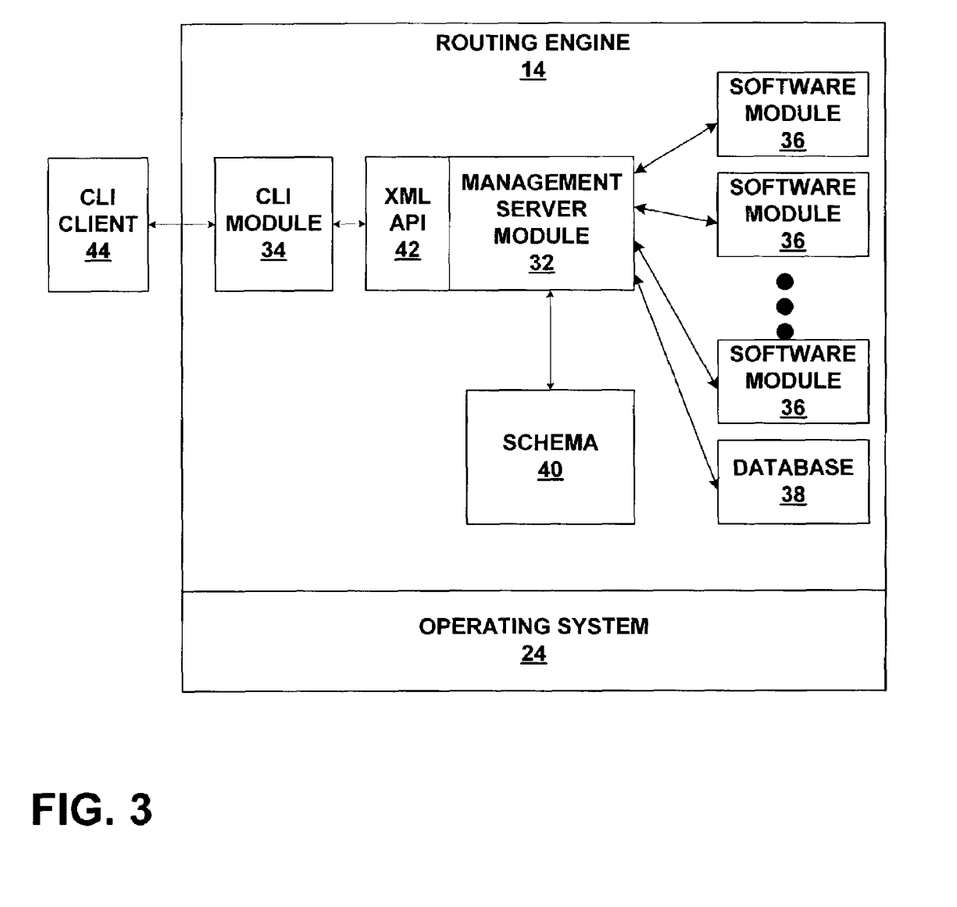
FIG. 3 is a block diagram illustrating a network router incorporating a command line interface according to the principles of the invention.

FIG. 3 is a block diagram illustrating a network router incorporating a CLI module that supports distinguishing between applied and non-applied router configuration information, consistent with the principles of the invention. In the example of FIG. 3, management server module 32 accesses one or more system modules 36 running on routing engine 14, as well as other router resources, such as database 38, to serve client requests. System modules 36 may include a variety of software modules such as chassis module 26, device configuration modules 28, and routing protocol module 30 described with reference to FIG. 2.

Database 38 may store information associated with system modules 36, such as router configuration information and operational information. A management interface schema 40 maps extensible markup language tags received by management server module 32 to information associated with system modules 36, including the information in database 38 and information that may be obtained directly from system modules 36. Schema 40 may take the form of a data definition language (DDL) file, and can be stored on a hard disk or other data storage medium.

Management server module 32 presents an XML API 42. A variety of network router clients, such as a CLI client 44, may establish independent communication sessions with management server module 32 using CLI module 34. CLI client 44 may take the form of a remote computer operated by a human user who enters CLI commands encoded with XML tags that conform to the APL. In this case, the client application running on CLI client 44 may render the XML output received from management server module 32 as command line output, e.g., in a textual form.

CLI 34 may receive a command to display, change or add to the router configuration information, e.g., from CLI client 44. Consistent with the principles of the invention, CLI 34 formats the configuration information for a display or other output device associated with CLI client 44 in a way that distinguishes applied configuration information from non-applied configuration information. In particular, CLI 34 passes the command to management server module 32, which interacts with the appropriate router components, e.g., the configuration database, and generates a reply for CLI client 44. Again, the reply may be information concerning the current configuration of the router following receipt of a show interface command. Alternatively, the reply may be feedback acknowledging completion of a configuration command for addition or modification of configuration database 38.

Figure 4:
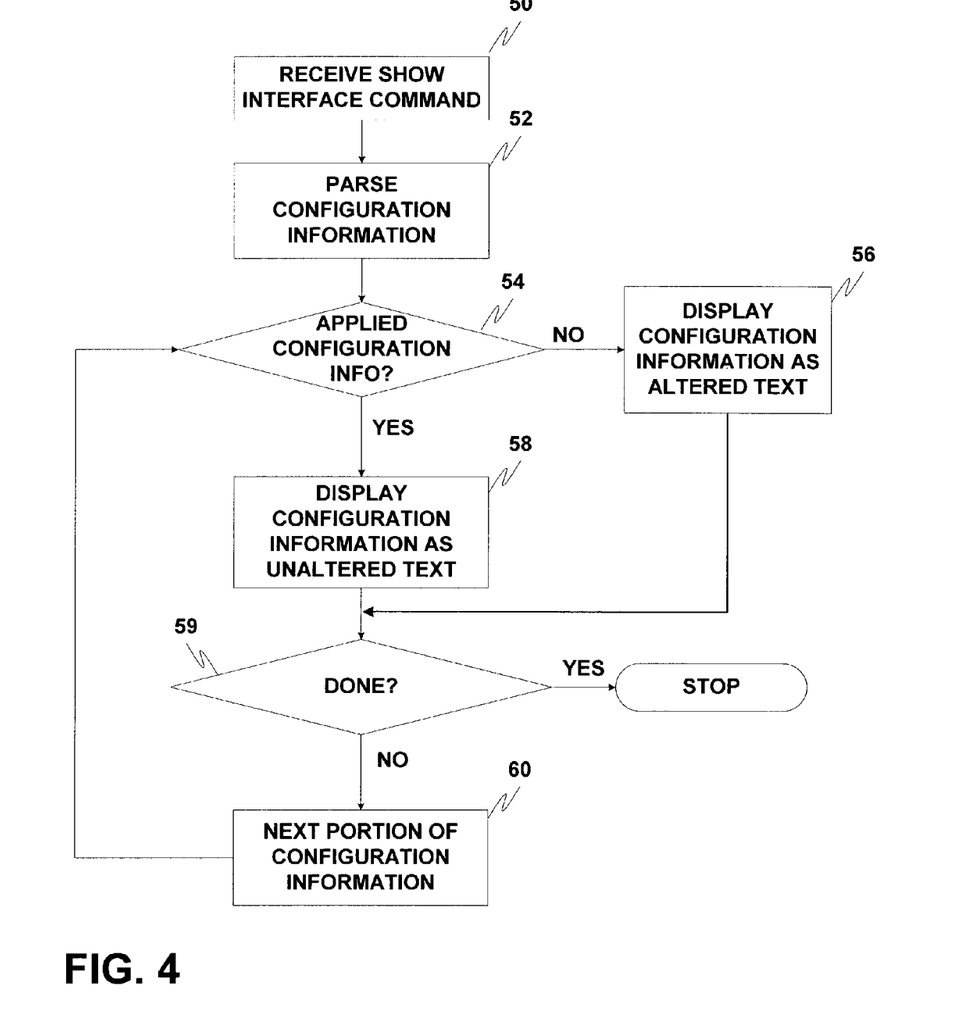
FIG. 4 is a flow diagram illustrating a mode of operation consistent with the principles of the invention.

FIG. 4 is a flow diagram illustrating an example mode of operation. After receiving a command to display the router configuration information (50), CLI 34 passes the command to management server module 32 via XML API 42. CLI client 44 then parses configuration information received from management server module 32 in a reply to determine portions of the configuration information that correspond to, for example, various types of IFCs (52). For example, the XML tags <interface-name> and </interface-name> might be interpreted as indicating that the content appearing between the tags represents the name of an interface.

CLI client 44 then determines whether one portion of the configuration information is currently applied (54), e.g., whether it corresponds to the type of IFC installed. If not, CLI client 44 renders and displays the configuration information as altered text (56). For example, the configuration information may be displayed as italicized or boldfaced text, or highlighted or shaded. On the other hand, if the configuration information in question is currently applied, CLI client 44 displays the configuration information as unaltered text (58). In either case, after displaying the portion of the configuration information, CLI client 44 proceeds to the next portion of the configuration information (60) and repeats the process (54) until the router configuration information has been displayed in its entirety.

Figure 5:
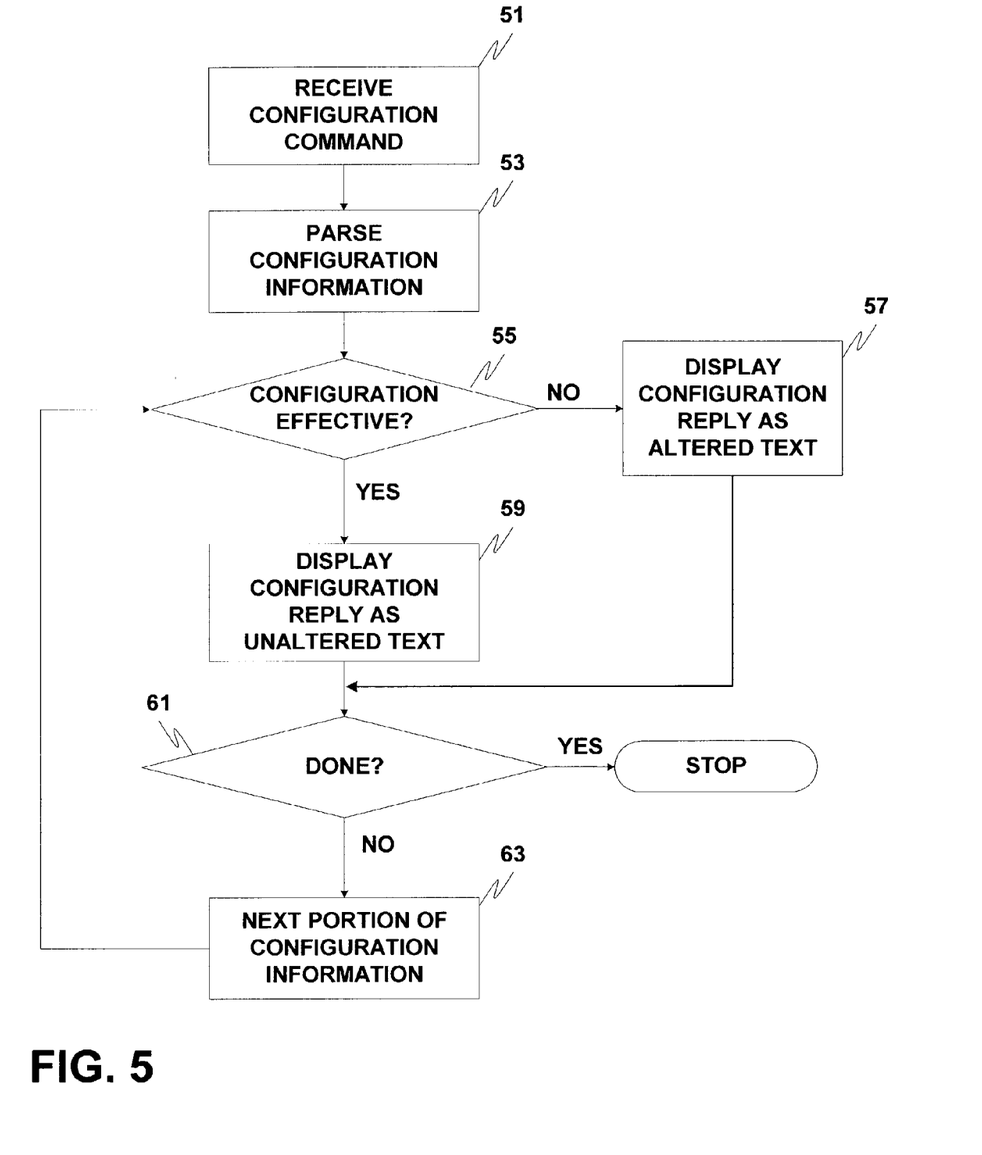
FIG. 5 is a flow diagram illustrating another mode of operation consistent with the principles of the invention.

FIG. 5 is a flow diagram illustrating another example mode of operation. In the example of FIG. 5, CLI client 44 transmits a configuration command to CLI 34. After receiving the command (51), CLI 34 passes the command to management server module 32 via XML API 42. Management server module 32 executes the command to completion even though some of all or the requested configuration may be ineffective, e.g., due to hardware mismatch. CLI client 44 then parses configuration feedback information received from management server module 32 in a configuration reply (53). In addition, CLI client 44 renders the configuration feedback information, including portions that were ineffective (55). In particular, management server module 32 may identify in the configuration feedback information those portions of the requested configuration that are ineffective.

In this manner, for ineffective configurations, CLI client 44 renders and displays the configuration feedback information as altered text (57). For example, the configuration feedback information may be displayed as italicized or boldfaced text, or highlighted or shaded. On the other hand, if the configuration in question was effective, CLI client 44 displays the configuration feedback information as unaltered text (59). In either case, after displaying the portion of the configuration feedback information, CLI client 44 proceeds to the next portion of the configuration feedback information (61) and repeats the process (63) until the router configuration information has been displayed in its entirety.

By way of example, a router may have ATM, fast Ethernet, and Sonet configurations loaded as follows:

```
interfaces {
    at-0/0/0 {
        unit 0 {
            family inet {
                address 10.0.0.1/8;
            }
        }
    }
    fe-0/0/0 {
        unit 0 {
            family inet {
                address 10.0.0.1/8;
            }
        }
    }
    so-0/0/0 {
        unit 0 {
            family inet {
                address 10.0.0.1/8;
            }
        }
    }
}
```

For purposes of this example, it is assumed that interface 0/0/0 has been loaded with a fast Ethernet IFC and that the technician has applied the fast Ethernet configuration. When a user submits a command to display the router configuration, e.g., via CLI client 44 and CLI 34, control module 12 parses the router configuration information into separate portions. One portion represents the ATM configuration:

```
at-0/0/0 {
    unit 0 {
        family inet {
            address 10.0.0.1/8;
        }
    }
}
```

Another portion represents the fast Ethernet configuration:

```
fe-0/0/0 {
    unit 0 {
        family inet {
            address 10.0.0.1/8;
        }
    }
}
```

The third portion represents the Sonet configuration:

```
so-0/0/0 {
    unit 0 {
        family inet {
            address 10.0.0.1/8;
        }
    }
}
```

Out of these three portions, only the second portion, representing the fast Ethernet configuration is applied in this case, as interface 0/0/0 has been installed with a fast Ethernet IFC. Accordingly, the router formats this portion to be displayed as unaltered text, but formats the other portions to be displayed as altered text.

Figure 6:
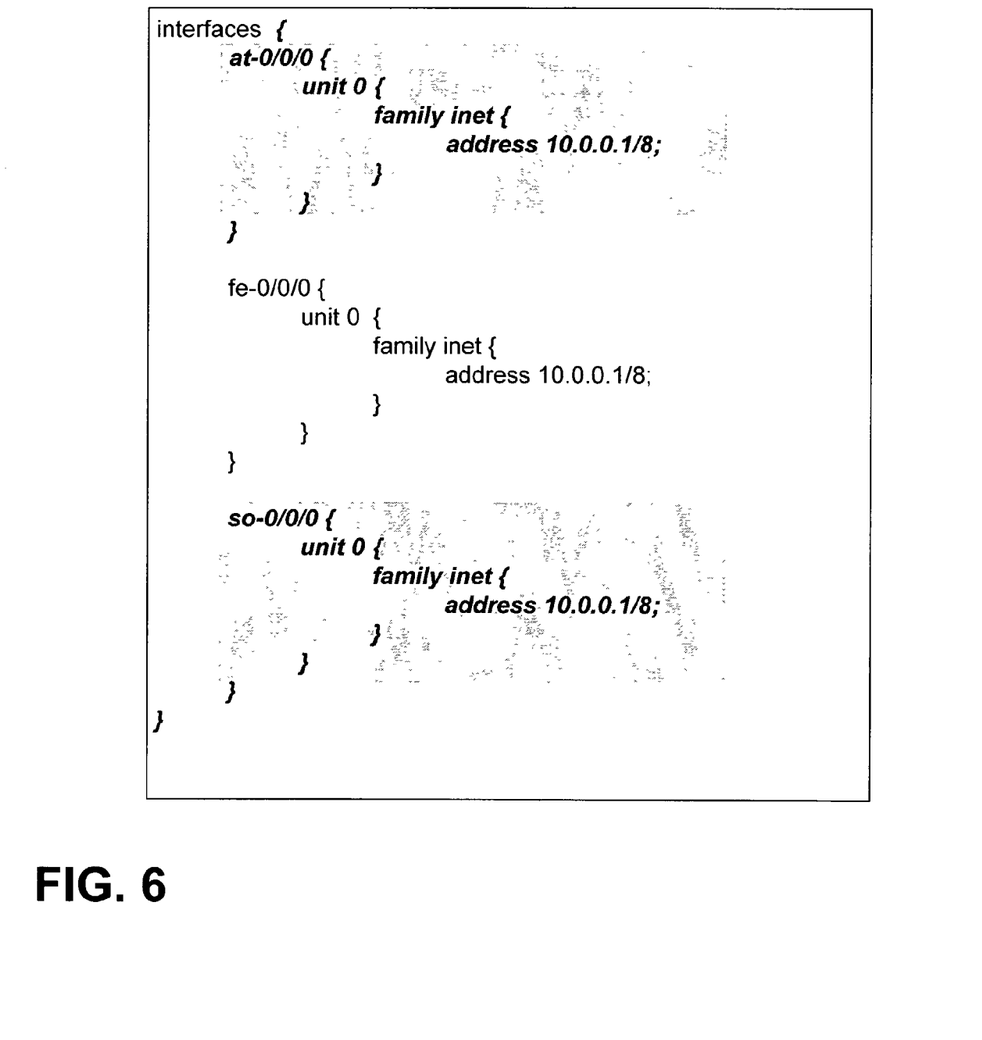
FIG. 6 is a diagram illustrating output of a network device in an operational example consistent with the principles of the invention.

FIG. 6 illustrates example output of a router in this scenario. In the example of FIG. 6, the non-applied portions of the configuration information are displayed as italicized and boldfaced text by CLI client 44 based on a reply from control unit 12 via CLI 34. In addition, the pertinent text could be shaded, as in FIG. 6. The user can thereby readily determine that these portions of the configuration represent phantom interfaces, while the portion appearing as unaltered text is applied and corresponds to an active interface. In general, the way in which the text is altered is subject to wide variation. Again, the text for non-applied or ineffective configurations may be distinguished from normal text by a variety of methods, including italicization, capitalization, highlighting, underlining, bolding, parentheses, colored text, addition of advisory comments, and the like.

Figure 7:
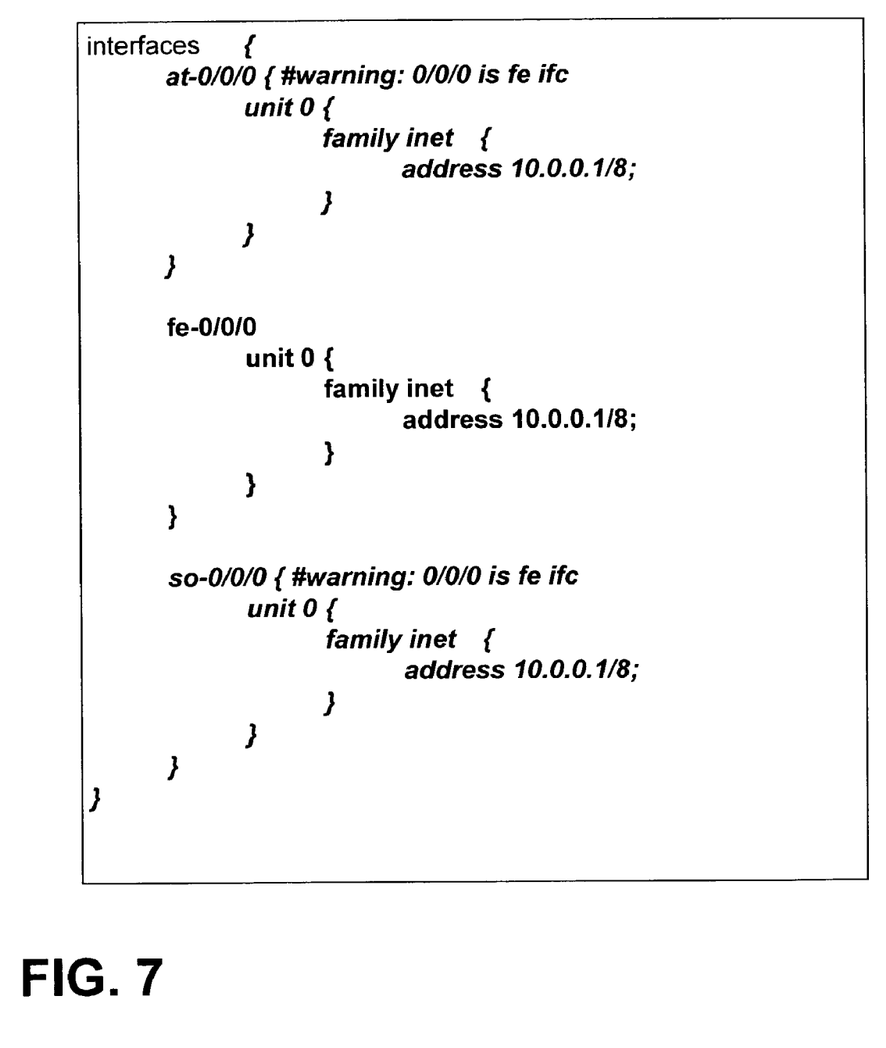
FIG. 7 is a diagram illustrating output of a network device in another operational example consistent with the principles of the invention.

FIG. 7 illustrates example output of the router for a scenario in which a requested configuration is ineffective. In the example of FIG. 7, the ineffective portions of the configuration information are displayed with commented text. As shown in FIG. 7, the comments indicate that a different IFC is loaded in the interface associated with the requested configuration ("#warning: 0/0/0 is fe ifc"). Accordingly, a request for a Sonet configuration will result in displayed information that indicates the configuration is ineffective. Again, the way in the which the text is distinguished may be subject to wide variation.

Router 4 may include, or be used in conjunction with, some form of computer-readable media. By way of example, and not limitation, computer readable media may comprise computer storage media and/or communication media. Computer storage media includes volatile and nonvolatile, removable and nonremovable media implemented in any method or technology for storage of information such as processor-readable instructions, data structures, program modules, or other data. Computer storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by router 4. Communication media typically embodies processor readable instructions, data structures, program modules, or other data in a modulated data signal, such as a carrier wave or other transport medium and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Computer readable media may also include combinations of any of the media described above. Accordingly, instructions for performing techniques as described herein may be carried by such media.

A number of implementations and embodiments of the invention have been described. Nevertheless, it is understood that various modifications can be made without departing from the spirit and scope of the invention. For example, in some implementations, the applied portions of the configuration may be displayed in an altered format and the unapplied portions may be displayed in an unaltered format. More significantly, while some embodiments of the invention have been described in the context of IFC configurations, the principles of the invention may be applied generally to any configuration having some portions that are applied and others that are not applied. Furthermore, although the functionality described in reference to a central control unit of a network device, e.g., control unit 12, the functionality may be distributed to the interface cards of the network device, e.g., IFCs 18. Accordingly, these and other embodiments are within the scope of the following claims.

What is claimed is:

1. A network device-implemented method comprising:
concurrently storing, within a configuration database of a network device, a first set of interface configuration information and a second set of interface configuration information for a physical interface slot of the network device, wherein the first set of interface configuration information and the second set of interface configuration information specify different types of interface cards for the physical interface slot;
detecting a type of interface card installed in the physical interface slot of the network device;
presenting the first set of interface configuration information in a first format when the type of interface card installed in the interface slot is the type of interface card specified by the first set of interface configuration information;
presenting the first set of interface configuration information in a second format when the type of interface card installed in the interface slot is not the type of interface card specified by the first set of interface configuration information;
presenting the second set of interface configuration information in the first format when the type of interface card installed in the interface slot is the type of interface specified by the second set of interface configuration information; and
presenting the second set of interface configuration information in the second format when the type of interface card installed in the interface slot is not the type of interface card specified by the second set of interface configuration information.

2. The method of claim 1, wherein the first set of interface configuration information is encoded with extensible markup language tags.

3. The method of claim 2, wherein the extensible markup language tags are defined by one or more data type definition (DTD) files.

4. The method of claim 2, wherein the extensible markup language tags are defined by one or more XML Schema Language files.

5. The method of claim 2, wherein the extensible markup language is XML.

6. The method of claim 1, wherein the method is implemented at least in part as a process within an operating environment executing on a routing engine of a network router.

7. The method of claim 1, wherein one of the first and second formats is selected from an italicized format, a bold format, a highlighted format, an underlined format, and a shaded format.

8. The method of claim 1, wherein the first and second formats differ from each other in at least one characteristic selected from font, font size, and font color.

9. The method of claim 1, wherein the first set of interface configuration information comprises configuration for at least one of a Sonet interface, a fast Ethernet interface, and an ATM interface.

10. A network device-implemented method comprising:
concurrently storing, within a configuration database of a network device, a first portion of interface configuration information and a second portion of interface configuration information for a physical interface slot of the network device, wherein the first portion of interface configuration information and the second portion of interface configuration information specify different types of interface cards for the physical interface slot;

detecting a type of interface card installed in the physical interface slot of the network device;

identifying at least the first portion of interface configuration information as specifying the type of interface card installed in the physical interface slot and at least the second portion of the interface configuration information as specifying a type of interface card that is not the type of interface card installed in the physical interface slot;

displaying the at least one first portion in a first text format; and displaying the at least one second portion in a second text format.

11. The method of claim 10, wherein one of the first and second text formats is selected from an italicized format, a bold format, a highlighted format, an underlined format, and a shaded format.

12. The method of claim 10, wherein the first and second text formats differ from each other in at least one characteristic selected from font, size, and font color.

13. The method of claim 10, further comprising referencing the configuration database to identify a type of interface card installed in the network device and displaying the network device configuration in one of the first and second text formats based on the type of interface card.

14. The method of claim 10, wherein the first portion of interface configuration information is encoded with extensible markup language (XML) tags.

15. The method of claim 14, wherein the extensible markup language tags are defined by one or more data type definition (DTD) files.

16. The method of claim 14, wherein the extensible markup language tags are defined by one or more XML Schema Language files.

17. The method of claim 10, wherein the method is implemented at least in part as a process within the operating environment executing on a routing engine of a network router.

18. A computer-readable storage medium comprising instructions to cause a programmable processor to:

store concurrently, within a configuration database of a network device, a first set of interface configuration information and a second set of interface configuration information for a physical interface slot of the network device, wherein the first set of interface configuration information and the second set of interface configuration information specify different types of interface cards for the physical interface slot;

detect a type of interface card installed in the interface slot of the network device;

present the first set of interface configuration information in a first format when the type of interface card installed in the interface slot is a type of interface card specified by the first set of interface configuration information;

present the first set of interface configuration information in a second format when the type of interface card installed in the interface slot is not the type of interface card specified by the first set of interface configuration information;

present the second set of interface configuration information associated with the physical interface slot in the first format when the type of interface card installed in the interface slot is a type of interface card specified by the second set of interface configuration information; and present the second set of interface configuration information in the second format when the type of interface card installed in the interface slot is not the type of interface card specified by the second set of interface configuration information.

19. The computer-readable storage medium of claim 18, wherein the first set of configuration information is encoded with extensible markup language tags.

20. The computer-readable storage medium of claim 19, wherein the extensible markup language tags are defined by one or more data type definition (DTD) files.

21. The computer-readable storage medium of claim 19, wherein the extensible markup language tags are defined by one or more XML Schema Language files.

22. The computer-readable storage medium of claim 19, wherein the extensible markup language is XML.

23. A computer-readable storage medium carrying instructions to cause a programmable processor to:

store concurrently, within a configuration database of a network device, a first portion of interface configuration information and a second portion of interface configuration information for a physical interface slot of a network device, wherein the first portion of interface configuration information and the second portion of interface configuration information specify different types of interface cards for the physical interface slot;

detect a type of interface card installed in the interface slot of the network device;

identify at least the first portion of interface configuration information as specifying the type of interface card installed in the interface slot and at least the second portion of the interface configuration information as specifying a type of interface card that is not installed in the interface slot;

display the first portion of interface configuration information in an unaltered text format; and display the second portion of interface configuration information in an altered text format.

24. The computer-readable storage medium of claim 23, wherein the first portion of configuration information is encoded with extensible markup language (XML) tags.

25. The computer-readable storage medium of claim 24, wherein the extensible markup language tags are defined by one or more data type definition (DTD) files.

26. The computer-readable storage medium of claim 24, wherein the extensible markup language tags are defined by one or more XML Schema Language files.

27. A device comprising:

a database that concurrently stores a first set of interface configuration information and a second set of interface configuration information for a physical interface slot of a network device, wherein the first set of interface configuration information and the second set of interface configuration information specify different types of interface cards for the physical interface slot;

a client interface that receives, from a network client, a request for interface configuration information;

a storage device storing a network management interface schema that maps extensible markup language tags to the first set of interface configuration information associated with at least one software module running on a network device; and a management server module to detect a type of interface card installed in the interface slot of the device, and to emit a reply encoded with extensible markup language tags according to the network management interface schema in response to the request, wherein the client interface is configured to display the first set of interface configuration information in a first format when the type of interface card installed in the interface slot is a type of interface card specified by the first set of interface configuration information and to display the first set of interface configuration information in a second format when the type of interface card installed in the interface slot is not the type of interface card specified by the first set of interface configuration information.

28. The device of claim 27, wherein the first set of configuration information is encoded with extensible markup language tags.

29. The device of claim 28, wherein the extensible markup language tags are defined by one or more data type definition (DTD) files.

30. The device of claim 28, wherein the extensible markup language tags are defined by one or more XML Schema Language files.

31. The device of claim 28, wherein the extensible markup language is XML.

32. A network device comprising:
 a database that concurrently stores a first portion of interface configuration information and a second portion of interface configuration information for a physical interface slot of a network device, wherein the first portion of interface configuration information and the second portion of interface configuration information specify different types of interface cards for the physical interface slot;
 a client interface that receives, from a network client, a request for interface configuration information;
 a storage device storing a network management interface schema that maps extensible markup language tags to the first portion of interface configuration information and the second portion of interface configuration information; and
 a management server module to detect a type of hardware interface installed in the interface slot and to emit a reply encoded with extensible markup language tags according to the network management interface schema in response to the request,
 wherein the client interface is configured to:
  identify at least the first portion of the interface configuration information as specifying the type of interface card installed in the interface slot and at least the second portion of the interface configuration information as specifying a type of interface card that is not the type of interface card installed in the interface slot,
  display the first portion in an unaltered text format and display the second portion in an altered text format.

33. The device of claim 32, wherein the network device is a network router.

34. The device of claim 32, wherein the first portion of interface configuration information is encoded with extensible markup language (XML) tags.

35. The device of claim 34, wherein the extensible markup language tags are defined by one or more data type definition (DTD) files.

36. The device of claim 34, wherein the extensible markup language tags are defined by one or more XML Schema Language files.

37. The method of claim 1, wherein the method further comprises receiving input from a user to modify the first set of interface configuration information when the type of interface card installed in the interface slot is not the type of interface card specified by the first set of interface configuration information.

38. The method of claim 10, wherein the method further comprises receiving input from a user to modify the type of interface card specified by the second portion of the configuration information.

39. The computer-readable storage medium of claim 18, wherein the instructions further cause the processor to receive input from a user to modify the first set of interface configuration information when the type of interface card installed in the interface slot is not the type of interface card specified by the first of interface configuration information.

40. The computer-readable storage medium of claim 23, wherein the instructions further cause the processor to receive input from a user to modify the second portion of the interface configuration information.

41. The device of claim 27, wherein the client interface displays in the second format a second set of interface configuration information associated with the interface slot that does not specify the type of interface configuration information installed in the interface slot.

42. The device of claim 32, wherein the client device is further configured to present an interface that receives input from a user to modify the second portion of the interface configuration information.

* * * * *